No. 675,873. Patented June 4, 1901.
M. HOLAUBEK.
TIRE.
(Application filed Feb. 28, 1901.)

(No Model.)

Witnesses.
Wm. D. Bell.
Robert J. Pollitt.

Inventor.
Marie Holaubek

United States Patent Office.

MARIE HOLAUBEK, OF VIENNA, AUSTRIA-HUNGARY, ASSIGNOR TO RUSSISCH OESTERR-UNGAR, HANDELS-AGENTUR E. VON BRANDIS, OF SAME PLACE.

TIRE.

SPECIFICATION forming part of Letters Patent No. 675,873, dated June 4, 1901.

Application filed February 28, 1901. Serial No. 49,203. (No model.)

*To all whom it may concern:*

Be it known that I, MARIE HOLAUBEK, a subject of the Emperor of Austria-Hungary, residing at 21 Wienstrasse, in the city of Vienna, in the Empire of Austria-Hungary, have invented certain new and useful Improvements in Tires, of which the following is a specification.

The present invention has reference to a vehicle-wheel with resilient tire for the purpose of neutralizing the shocks or concussions which a wheel is subjected to when running over uneven road-surfaces.

Hitherto in resilient wheels with spiral springs the pressure acted upon the latter unnaturally—viz., at right angles to their longitudinal axis. In the wheel according to the present invention the pressure bears upon the springs naturally—*i. e.*, in the direction of their longitudinal axis.

In order to make the invention more readily understood, I have illustrated it on the accompanying sheet of drawings, in which—

Figure 1:
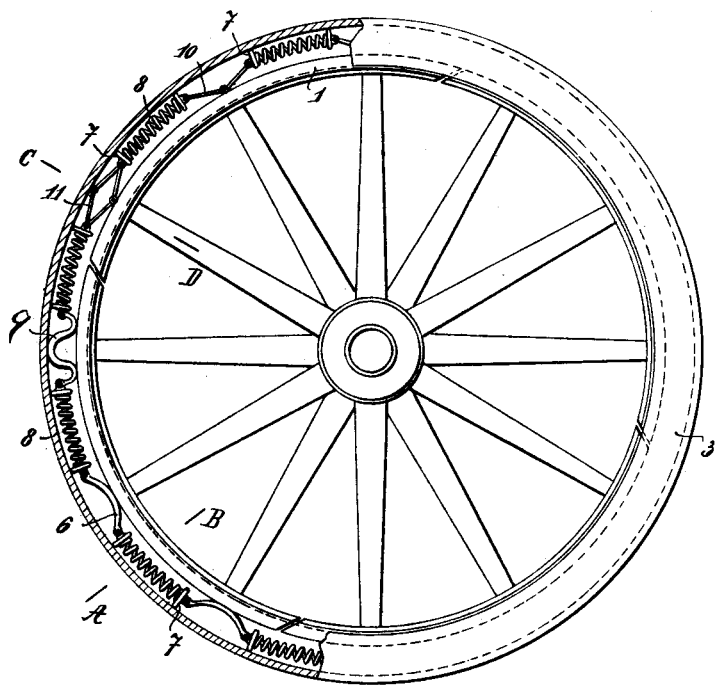
Figure 2:
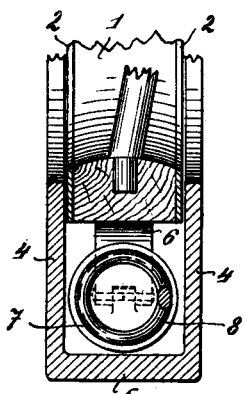

Figure 1 shows a side elevation of a wheel according to my invention, partly in section; and Fig. 2 is an enlarged sectional view on line $a\,b$ in Fig. 1.

The felly 1 is made up of a number of sections or segments which are not rigidly connected to one another, but are provided with side plates 2, overlapping each other. The tire 3 is U-shaped in section and is preferably made in one piece. The two sides of the U form the support for the segments of the felly with the side plates, while a suitably-stiffened cross-piece 5 of the U forms the rim of the wheel. A suitable number of helical springs are provided in the space between the felly 1 and the tire 3 and are separated from each other by curved leaf-springs or the like. The springs 6, of which one is preferably placed under the base of each spoke, are curved or undulated. Upon their vertices the felly 1 rests. The ends of the said springs are articulated to guiding-disks 7. In the spaces between the curved or undulated springs 8 helical springs are placed. Instead of the springs 6 more acutely bent springs 9 may be used, their vertices resting upon the bottom of the tire 3 and the felly 1 pressing upon their bent ends.

The action of the wheel is the following: The jolts caused by unevenness of the ground result in a relative displacement of felly and tire, the latter being placed eccentrically to the tire. The felly then exerts pressure upon the leaf-springs, which are then extended, compressing, by means of the guide-disks, the helical springs in the direction of their longitudinal axis. On the pressure being removed the helical springs produce the normal condition again. In this manner concussions are received and neutralized by the helical springs, and the latter are used in a manner adapted to their shape, the conditions under which they are acted upon being the most favorable and the resiliency obtained being extensive, continuous, and endless.

What I claim, and desire to secure by Letters Patent, is—

1. In a vehicle-wheel, the combination of a U-shaped tire, a plurality of spaced helical springs arranged in said tire, curved or undulated leaf-springs interposed between the said helical springs and connected to the ends thereof, guide-disks carried by said leaf-springs and bearing against the ends of the adjoining helical springs, and a felly made up of a plurality of segments, said segments being guided in the tire, substantially as described.

2. In a vehicle-wheel, the combination of a U-shaped tire, a plurality of helical springs, resting in the hollow of said tire, curved or undulated leaf-springs interposed between the said helical springs, guide-disks articulated to either end of the said leaf-springs and bearing against the adjoining helical springs, a felly made up of a plurality of segments, guided in the said U-shaped tire, overlapping side plates arranged upon either side of the felly-segments and movably connecting the said felly-segments, and spokes corresponding to the number of the said interposed leaf-springs, the parts being constructed, arranged and working substantially as and for the purpose set forth.

In testimony whereof I have hereunto set my hand in presence of two subscribing witnesses.

MARIE HOLAUBEK.

Witnesses:
  HERM. REIBEUS,
  ALVESTO S. HOGUE.